Figure 7:
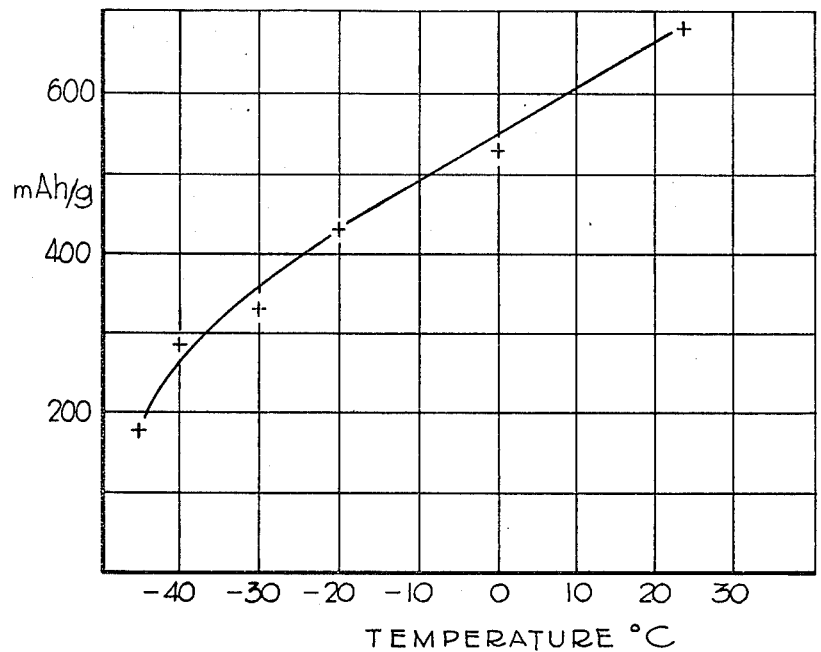

United States Patent [19]

Armstrong et al.

[11] 4,175,168
[45] Nov. 20, 1979

[54] ZINC ELECTRODE FOR LOW TEMPERATURE

[75] Inventors: William A. Armstrong; Peter J. Powell, both of Ottawa, Canada

[73] Assignee: Her Majesty the Queen in right of Canada as represented by the Minister of National Defence, Canada

[21] Appl. No.: 948,524

[22] Filed: Oct. 4, 1978

[30] Foreign Application Priority Data

Oct. 12, 1977 [CA] Canada ................................. 288578

[51] Int. Cl.$^2$ ............................................. H01M 4/42
[52] U.S. Cl. ................................................ 429/229
[58] Field of Search ............................... 429/229-231, 429/209; 428/131, 176

[56] References Cited

U.S. PATENT DOCUMENTS

| 2,906,802 | 9/1959 | Andre ............................... 204/229 X |
| 3,205,097 | 9/1965 | Clune et al. ..................... 429/164 X |
| 3,749,608 | 7/1973 | Sarbacher ........................... 429/209 |
| 4,007,054 | 2/1977 | Marincic ......................... 429/230 X |

FOREIGN PATENT DOCUMENTS 1172173 11/1969 United Kingdom .
1341151 12/1973 United Kingdom .

Primary Examiner—Charles F. LeFevour
Attorney, Agent, or Firm—Cushman, Darby & Cushman

[57] ABSTRACT

The invention disclosed relates to electrodes for use in electrochemical cells, particularly for low temperature applications, wherein the electrode comprises a strip of perforated electrochemically active material folded upon itself to form a plurality of sections. Perforated electrochemically active spacers are provided between and attached to adjacent sections.

17 Claims, 8 Drawing Figures

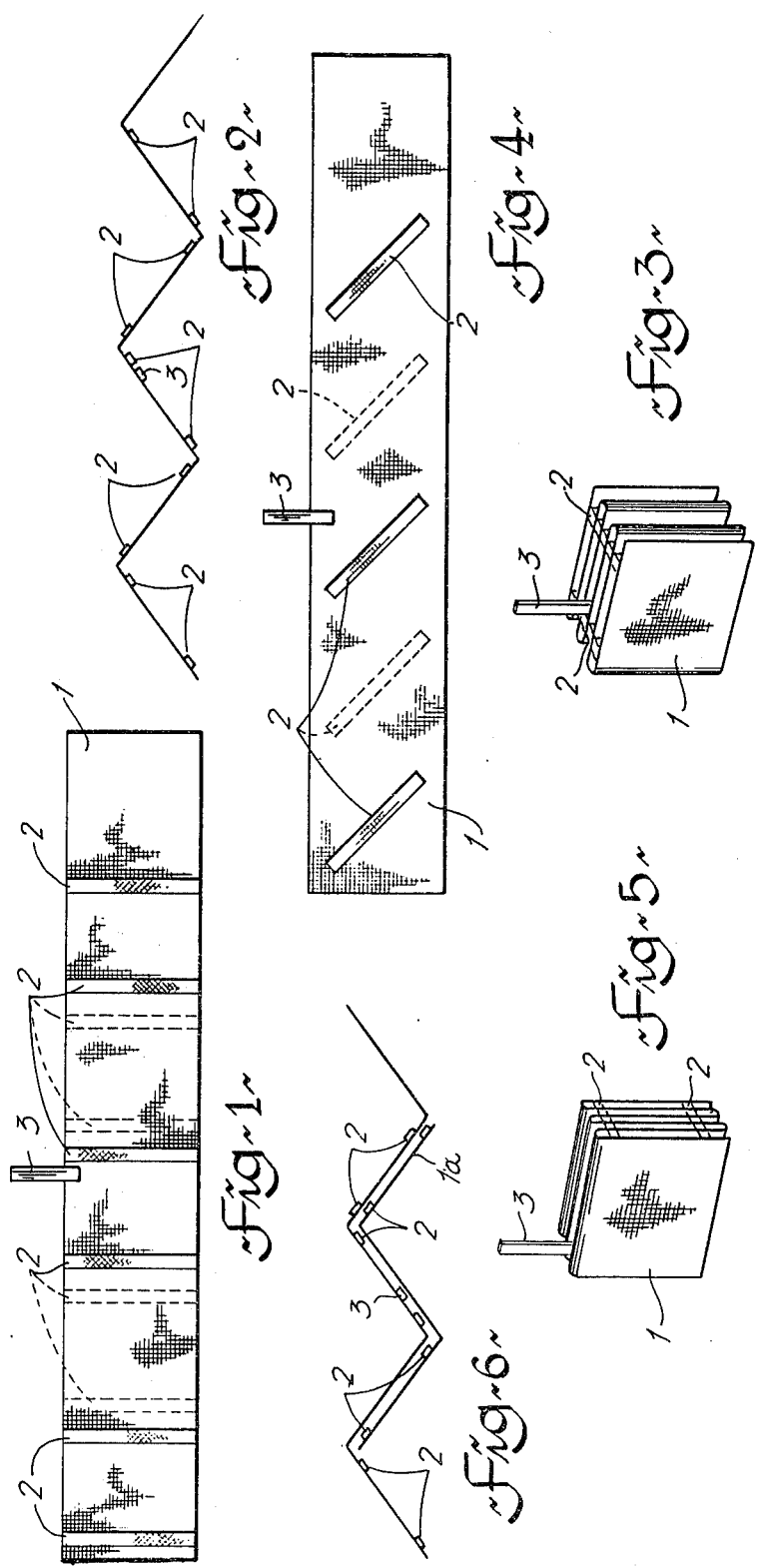

ZINC ELECTRODE FOR LOW TEMPERATURE

This invention relates to electrodes for use in electrochemical cells, and in particular to the employment of zinc electrodes at low temperatures.

The problem concerns the low coulombic efficiency of conventional zinc electrodes when they are discharged at low temperature i.e. at $-29°$ C. or lower, at other than very low current densities. This characteristic severely restricts the use in cold climates of batteries having zinc as an active material. In the case of a zinc-/air battery, for example, the air electrode can sustain current densities of 25 mA/cm$^2$ or greater at temperatures as low as $-40°$ C. but the zinc electrode, although more than capable of matching this performance at normal ambient temperatures, passivates rapidly at low temperatures and limits the battery discharge capacity to about 10% of the nominal value. This passivation is caused by the building up during discharge at low temperatures of a dense layer of zinc oxide on the surface of planar zinc electrodes or within the pores of porous electrodes.

A variety of methods for making porous zinc electrodes with improved characteristics at $-20°$ C. have been disclosed. It has been found that the major source of passivation is the formation of insoluble zinc oxide within the electrode pores. The solubility of zinc oxide in the electrolyte decreases with decreasing temperature. Accordingly, porous electrodes have very limited capacity at low temperatures.

U.S. Pat. No. 3,205,097 which issued on Sept. 7, 1965 to R. R. Clune et al, attempts to solve the passivation problem by providing a zinc electrode in corrugated form, the corrugations being deep enough to accommodate the zinc oxide formed during discharge. However, usefulness of this electrode is limited to temperatures above $-20°$ F.

British Pat. No. 1,341,151 published Dec. 19, 1973 in the name of Svenska Ackumulator, teaches the employment of folded, rather than corrugated electrodes, the difference being in the limits place on the depth of corrugation i.e. 2 to 5 times the thickness of the zinc electrode material. The depth of folds is not related to the thickness of the zinc, but rather on the dimensions of the battery cell cavity employed. In this patent, the electrode skeleton consists of a perforated or expanded metal foil. The foil merely acts as a support for an electrochemically active paste and it is not itself electrochemically active.

British Pat. No. 1,172,173 published Nov. 26, 1969 in the name of Union Carbide Corporation discloses the use of two or more sheets of electrochemically active expanded zinc superimposed upon one another in such a manner that the grid structures are randomly oriented. The separate sheets of expanded metal are spot welded together.

Applicant has now found that by employing a folded electrode configuration wherein the electrode is in the form of a perforated electrochemically active metal material, in conjunction with spacers which are also of a perforated electrochemically active metal material, considerable improvement in performance at low temperatures is achieved.

In the corrugated electrodes discussed previously, the corrugations are designed to accommodate the zinc oxide formed during discharge, whereas in our electrode it is the perforations in the electrochemically active electrode material which serve this purpose. Moreover, it is undesirable to corrugate the zinc strip to a thickness substantially exceeding five times its original thickness, whereas in our electrode no such limitation is placed on the size of the folds. In the aforementioned folded electrode the perforated or expanded foil acts merely as a support for the electrochemically active material, whereas our electrode is itself electrochemically active and is consumed during discharge of the electrode. Moreover, in the spot-welded electrode discussed above, the electronic resistance is accordingly higher than in a folded electrode.

A more important difference is that our design requires the insertion of spacers between the folded sections of perforated electrochemically active material, while their description requires the compression molding of zinc metal to various bulk densities ranging from 2.5 to 1 g/cm$^3$. The density of our anode is greater than 4 g/cm$^2$.

Inert spacers are commonly used in battery construction to separate anodes from cathodes. What is novel about our spacers is that they separate sections of one electrode, the anode. Moreover, they too are constructed of perforated electrochemically active metal material and thus by taking part in the electrochemical discharge reaction, they contribute to the electrical output of the battery. Moreover, since they are made of perforated rather than sheet material they allow access of electrolyte to the more reactive because of its higher surface area electrochemically active material of the body of the electrode.

Figure 8:
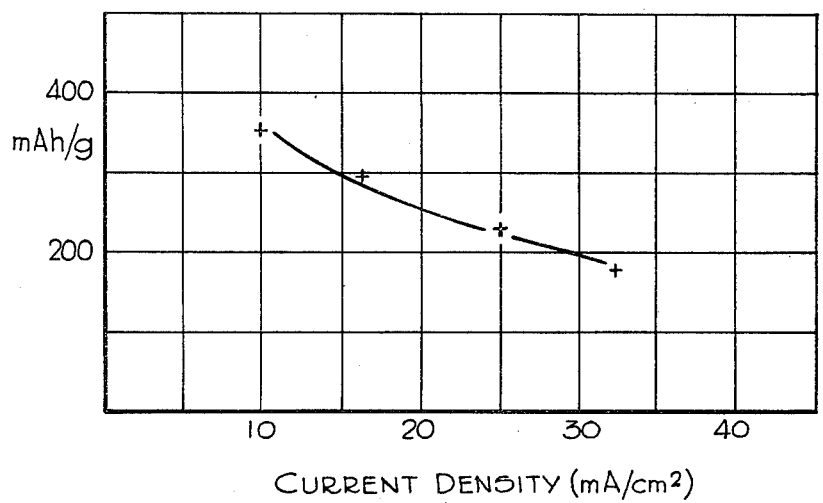

In the drawings which serve to illustrate perferred embodiments of the invention, FIG. 1 is a plan view, partly in section, illustrating one configuration of a strip of electrode material and spacers, prior to folding, FIG. 2 is a plan view of the same configuration of a strip of electrode material and spacers, partially folded, FIG. 3 is a perspective view of a completed electrode of the same configuration, FIG. 4 is a plan view, partly in section, of another configuration of a strip of electrode material and spacers, prior to folding, FIG. 5 is a perspective view of a completed electrode of yet another configuration, FIG. 6 is a plan view of a further configuration of a strip of electrode material and spacers, partially folded, FIG. 7 is a graph illustrating the effect of temperature on capacity of amalgamated zinc electrodes discharged in zinc/air bi-cells at 16 mA/cm$^2$, and FIG. 8 is a graph illustrating the effect of current density on capacity of amalgamated zinc electrodes discharged in zinc/air bicells at $-40°$ C.

Referring to the drawings, a zinc electrode is prepared by uniformly folding in a zig-zag fashion a strip of expanded or woven zinc of a specific mesh size to which have been attached narrow spacer bars also of expanded or woven zinc, but being thicker and having a much larger mesh size than the zinc strip to permit sufficient access of the electrolyte to the electrode body.

As shown in FIG. 1, expanded zinc spacer bars, conveniently about 2 mm wide, 2, are attached by spot welds to a strip of expanded zinc 1, in an arrangement such that separation between adjacent sections of zinc is assured when the strip is folded in a zig-zag fashion as in FIG. 2. A conductive lead-off tab 3, is spot welded to the strip prior to folding. The completed electrode shown in FIG. 3, is normally de-greased in a solvent such as trichloroethylene. It may then be amalgamated by any of the conventional methods but most easily by immersion in an aqueous solution of a mercuric salt such as mercuric chloride and mercuric acetate.

The mesh size of the zinc strip is sufficiently fine to give an electrode with a very high surface area but coarse enough to accommodate a building-up of zinc oxide during the discharge and also to allow convective flow of electrolyte through the electrode even at low temperature. Mesh sizes in the range 3/0 to 6/0 have been used successfully.

The spacer bars must be thick enough to permit an adequate flow of electrolyte between adjacent sections of the electrode. A thickness of about double that of the expanded zinc strip is sufficient. However, it will be appreciated that the maximum practical thickness of the spacers is determined by the overall battery cell design and, in particular, by the values chosen for the ratio of the volume of electrolyte to the weight of the zinc and the current densities to be experienced by both cathode and anode during discharge. The mesh size of the spacers is normally greater than that of the body of the electrode to allow access of the electrolyte to as great an area of the electrode surface as possible. Spacers 0.2 cm wide of mesh size 3/0 and thickness 0.048 cm have been used successfully with a zinc strip of mesh size 6/0 and thickness 0.018 cm.

Configurations other than the one shown in FIGS. 1 to 3 (Configuration 1) are possible. Configuration 2 (FIG. 4) differs from Configuration 1 only in that one-half the number of spacers are used and these are attached diagonally rather than vertically. Configuration 3 (FIG. 5) differs from Configuration 1 only in that the folded electrode is rotated through 90° before the conductive lead-off is attached. Configuration 4 differs from Configuration 1 only in that the spacer bars are replaced by a layer of filter paper and is included, but not illustrated, for comparison purposes. Configuration 5 utilizes two zinc strips which may be of different mesh sizes, 1 and 1(a), interleaved and both electrically connected to the conductive lead-off by spot welds. The spacer bars are attached to each strip and face the adjacent strip as shown in FIG. 6. Configuration 6 differs from Configuration 5 only in that no spacer bars are attached to the expanded zinc strips and is also included, but not illustrated, for comparison purposes.

Electrodes made in these configurations from expanded zinc strips of various mesh sizes and weighing between two and three grams were evaluated by being discharged in zinc/air bicells. Discharges were carried out at −40° C., using 6.8 molar potassium hydroxide as the electrolyte, by impressing a constant current of 200 mA which corresponded to a current density of 16 mA/cm$^2$ (based on the geometric area) on each side of the zinc anode. The duration of discharge to a lower cell voltage limit of 0.90 volts for each of the electrodes is recorded in Table 1.

TABLE I

| Configuration No. | Mesh Size | No. of Folded Sections | Weight of Zinc* (g) | Duration of Discharge (minutes) | Capacity per gram of Zinc* mAh/g |
|---|---|---|---|---|---|
| 1 | 4/0 | 6 | 2.19 | 101.3 | 154 |
| 1 | 6/0 | 6 | 2.61 | 146.4 | 187 |
| 2 | 6/0 | 6 | 2.61 | 141.4 | 181 |
| 3 | 6/0 | 6 | 2.61 | 134.3 | 172 |
| 4 | 4/0 | 6 | 2.19 | 82.6 | 126 |
| 5 | 4/0 | 5 plus | 3.12 | 174.4 | 186 |
| 5 | 6/0 | 3 | | | |
| 6 | 4/0 | 5 plus | 3.12 | 135.1 | 144.3 |
| 6 | 6/0 | 3 | | | |

*Not including weight of spacer bars.

From Table 1 it is evident that Configuration 1 using 6/0 mesh zinc is the preferred electrode if maximum duration of discharge per gram of zinc and simplicity of manufacture are the criteria to be satisfied. In applications which require a maximum duration of discharge for a given battery volume, the expense of two different grades of expanded zinc as in Configuration 5 may be justified.

Configuration 2 is only slightly less satisfactory than Configuration 1 and may be acceptable for many applications. Configuration 3 hinders the vertical convective flow of electrolyte in the cell and this may explain significantly less satisfactory results.

The low values of capacity per gram of zinc determined for Configurations 4 and 6 demonstrate the sharply reduced performance observed when electrochemically active spacer bars are not included in the electrode design.

It is well known that amalgamation greatly reduces the evolution of gas caused by the establishment of local gassing couples due to the presence of impurities in zinc. For this reason most zinc battery electrodes are amalgamated. However, amalgamation reduces the performance of porous zinc electrodes at very low temperatures. It was, therefore, surprising to find that amalgamation of our expanded zinc electrode by immersion in an aqueous mercuric salt solution greatly increased the capacity per gram of zinc at −40° C. This is demonstrated by the results recorded in Table II. Amalgamated electrodes prepared according to Configuration 1 and consisting of six folded sections of 6/0 mesh zinc were discharged in zinc/air bicells at −40° C. as described above with the exception that 7.9 molar potassium hydroxide electrolyte was used in place of 6.8 molar, the higher concentration having been found to be more suitable for low temperature discharges.

TABLE 11

| Weight of Zinc* g | Mercury %/w | Duration of Discharge (minutes) | Capacity per gram of Zinc* mAh/g |
|---|---|---|---|
| 3.10 | 0 | 174.7 | 188 |
| 3.05 | 0.05 | 252.5 | 276 |
| 3.06 | 0.1 | 259.1 | 283 |
| 3.03 | 0.2 | 250.9 | 276 |
| 3.12 | 0.4 | 275.8 | 295 |
| 3.10 | 2.0 | 258.7 | 278 |

*Including weight of spacers. Theoretical capacity is 820 mAh/g.

It is evident that even low concentrations of mercury (<0.1%/w) greatly improve the coulombic efficiency of anodes discharged at low temperatures. As the zinc spacers can also take part in the electrochemical discharge reaction, their weight was included in the calculation of anode capacity.

FIG. 7 illustrates the effect of temperature on the coulombic efficiency of an amalgamated electrode discharged in a zinc/air bicell at a current density of 16 mA/cm² while in FIG. 8, the effect of current density on efficiency of discharge at −40° C. is recorded.

The considerable improvement in performance at low temperatures of our electrode is readily apparent if the above results are compared with those of other workers using porous zinc electrodes. Referring to an article by F. Przybyla and F. J. Kelly. Power Sources 2, p. 373 Pergamon Press (1970), for example, at −40° C. and a current density of 20 mA/cm² they reported a capacity per gram of zinc of 4 mAh/g for porous electrodes while our electrode under the same conditions gave 250 mAh (see FIG. 8).

It should be noted that this improved zinc electrode may be used not only in conjunction with an air cathode in a zinc/air battery, as we have done for ease of evaluation, but with any of the cathodes commonly coupled with zinc in battery systems. Examples of such cathodes are manganese dioxide, silver oxide and nickel oxide.

The configuration described herein of an electrode prepared by folding in a zig-zag fashion a strip of expanded or woven metal to which are attached spacer bars also of expanded or woven metal is applicable to other electrochemically active metals used as anodes in batteries which are capable of being expanded or woven. Aluminum, magnesium and iron are examples.

The embodiments of the invention in which an exclusive property or privilege is claimed are defined as follows:

1. An electrode for use in an electrochemical cell comprising a strip of a perforated electrochemically active metal material, said strip being folded upon itself to form sections, and a plurality of spacers attached between and separating adjacent sections, said spacer being made of a perforated electrochemically active material and being of sufficient thickness to permit adequate electrolyte flow between adjacent sections.

2. An electrode as claimed in claim 1, wherein said perforated material is selected from a suitably sized mesh and expanded metal.

3. An electrode as claimed in claim 2, wherein the perforations in said spacers are larger than those in said sections.

4. An electrode as claimed in claim 3, wherein the perforated material is a mesh, and wherein the mesh size is in the range of 3/0 to 6/0.

5. An electrode as claimed in claim 4, wherein the spacers are of a material which is thicker than that of said sections.

6. An electrode as claimed in claim 5, wherein the thickness of said spacers is about double that of said sections.

7. An electrode as claimed in claim 6, wherein said folds are in zig-zag fashion.

8. An electrode as claimed in claim 7, wherein the zig-zag folds are substantially uniform.

9. An electrode as claimed in claim 8, wherein the spacers are about 0.048 cm thick and are of a mesh size of about 3/0 and wherein said sections are about 0.18 cm thick and are of a mesh size of about 6/0.

10. An electrode as claimed in claim 9, wherein the spacers are arranged parallel to each other.

11. An electrode as claimed in claim 10, wherein the spacers are arranged at an angle to the horizontal axis of the strip.

12. An electrode as claimed in claim 11, wherein the spacers are at right angles to the longitudinal axis of the strip.

13. An electrode as claimed in claim 4, wherein two strips of electrochemically active material are folded and interleaved, in such a manner that spacers attached to each strip are facing the adjacent strip.

14. An electrode as claimed in claim 13, wherein the two strips are of different mesh sizes.

15. An electrode as claimed in claim 4, wherein the electrochemically active material is amalgamated by dipping in a suitable mercuric salt.

16. An electrode as claimed in claim 15, wherein the amalgamated electrochemically material includes 0.05 to 2%/w mercury.

17. An electrode as claimed in claim 4, 13 or 15, wherein the electrochemically active material is zinc.

* * * * *